United States Patent
Daoud

(10) Patent No.: US 6,463,203 B1
(45) Date of Patent: Oct. 8, 2002

(54) HIGH PRESSURE SEALED TELECOMMUNICATIONS EQUIPMENT ENCLOSURE

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/363,531

(22) Filed: Jul. 29, 1999

(51) Int. Cl.⁷ ................................................ G02B 6/00
(52) U.S. Cl. .................. 385/134; 220/3.02; 174/50.5; 385/135
(58) Field of Search ............................. 385/134–137, 385/99; 285/355; 220/4.02, 3.2, 378; 174/17 CT, 50.5, 67; 118/733

(56) References Cited

U.S. PATENT DOCUMENTS

| | | | | |
|---|---|---|---|---|
| 4,246,797 A | * | 1/1981 | Myles | 73/744 |
| 4,465,201 A | * | 8/1984 | Chalfant, Jr. | 220/3 |
| 4,570,983 A | * | 2/1986 | Olenfalk | 285/355 |
| 4,839,782 A | * | 6/1989 | Sikora | 362/363 |
| 4,913,522 A | | 4/1990 | Nolf et al. | 350/96.2 |
| 4,983,008 A | | 1/1991 | Campbell et al. | 350/96.16 |
| 5,059,748 A | | 10/1991 | Allen et al. | 174/87 |
| 5,069,516 A | | 12/1991 | Kohy et al. | 350/96.1 |
| 5,155,794 A | | 10/1992 | Nolf et al. | 385/135 |
| 5,249,253 A | | 9/1993 | Franckx et al. | 385/135 |
| 5,308,923 A | | 5/1994 | Puigcerver et al. | 174/87 |
| 5,315,489 A | | 5/1994 | McCall et al. | 361/801 |
| 5,396,575 A | | 3/1995 | Hayward et al. | 385/135 |
| 5,568,584 A | * | 10/1996 | Smith | 385/135 |
| 5,579,718 A | * | 12/1996 | Freerks | 118/733 |
| 5,602,954 A | | 2/1997 | Nolf et al. | 385/135 |
| 5,603,401 A | * | 2/1997 | Brunner | 206/204 |
| 5,710,804 A | | 1/1998 | Bhame et al. | 379/58 |
| 5,754,723 A | * | 5/1998 | Fremgen | 385/135 |
| 5,911,117 A | | 6/1999 | Bhame et al. | 455/90 |
| 6,215,939 B1 | * | 4/2001 | Cloud | 385/135 |

* cited by examiner

*Primary Examiner*—Frank G. Font
*Assistant Examiner*—Michael P Mooney
(74) *Attorney, Agent, or Firm*—Birch, Stewart, Kolasch & Birch, LLP

(57) ABSTRACT

A sealed assembly, includes a telecommunications enclosure having an inner rim with an upwardly facing tilted surface. The tilted surface of the enclosure has a tilt angle between about 30 degrees and about 60 degrees, preferably about 45 degrees. At least one, and preferably two, o-rings are provided. An end cap is shaped to fit the enclosure. The end cap has a groove. The groove has at least two sides for holding the o-ring in a position to contact the tilted surface of the rim, so that the o-ring is compressed between at least three surfaces when the end cap is in place on the enclosure. This construction forms a high-pressure seal between the rim and the end cap. The groove may include a curved surface for trapping the o-ring. Alternatively, the groove may include three flat surfaces instead of a flat surface and a curved surface.

12 Claims, 4 Drawing Sheets

HIGH PRESSURE SEALED TELECOMMUNICATIONS EQUIPMENT ENCLOSURE

FIELD OF THE INVENTION

The present invention relates to telecommunications equipment generally, and more specifically to enclosures suitable for communications cables, such as optical fiber cables.

DESCRIPTION OF THE RELATED ART

Optical fiber communication networks have gained wide acceptance in place of the use of electrical cable systems, due to the significantly enhanced bandwidth capabilities of optical fiber and its immunity to electromagnetic and radiomagnetic interference. Very significant advantages are achievable by the use of optical fiber rather than electrical conduction media. Nevertheless, a continuing problem with the deployment of optical fiber systems is providing a method to terminate optical fiber cables so as to make electrical or optical connections to fibers within the cables while providing adequate environmental protection and allowing for easy installation.

U.S. Pat. No. 5,069,516 to Kohy et al. and U.S. Pat. No. 5,396,575 to Hayward et al. are expressly incorporated by reference herein in their entireties for their teachings on sealed fiber enclosures.

Fiber enclosures are required to be water tight, as they are subjected to a variety of environmental conditions. Such enclosures are frequently deployed underground, and it is important to ensure that water does not come in contact with the optical fiber cables or electronic equipment. High pressure seals are preferred for the enclosures, because a seal that cannot be penetrated by air is not penetrated by water either.

Because there is a need to access the equipment inside the enclosures to reconfigure the equipment following deployment, the enclosures cannot be permanently sealed. Rather, a seal is required that is easily released in order to perform work inside the enclosure, and easy to reseal when the work is completed. It is common to use an o-ring seal in fiber optic enclosures. If particles of dirt or grease get on the o-ring, the o-ring may not seal properly. It is particularly difficult to detect these impurities visually.

Thus, a high-pressure seal is desired that is reliable and water-tight.

SUMMARY OF THE INVENTION

The present invention is a sealed telecommunications enclosure assembly. A telecommunications enclosure has an inner rim. The inner rim has an upwardly facing tilted surface. At least one o-ring is provided. An end cap is shaped to fit the enclosure. The end cap has a groove. The groove has at least two sides for holding the o-ring in a position to contact the tilted surface of the rim, so that the o-ring is compressed between at least three surfaces when the end cap is in place on the enclosure, thereby to form a seal between the rim and the end cap.

DETAILED DESCRIPTION

Figure 1:
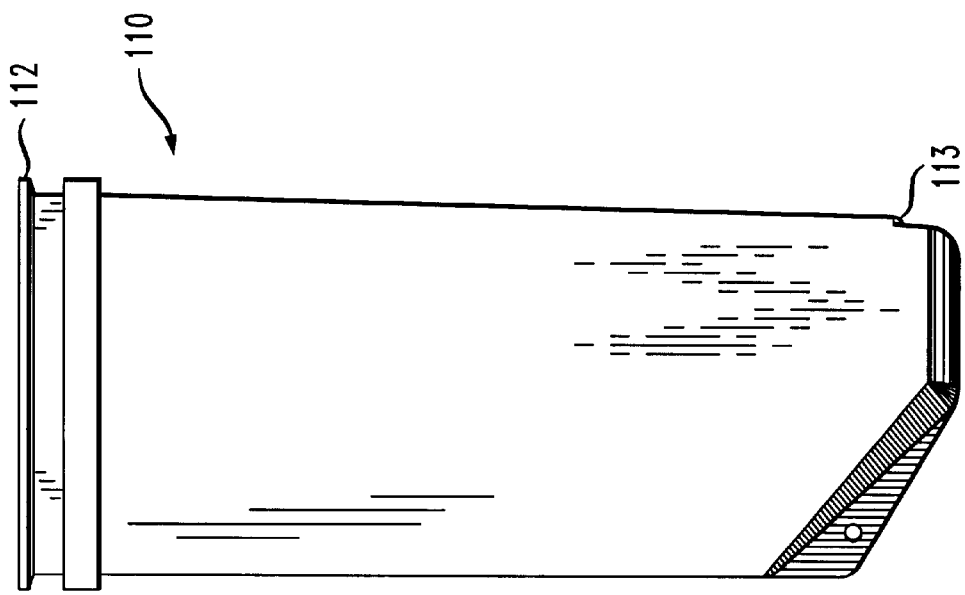
FIG. 1 is a rear elevation view of an exemplary enclosure according to the present invention.
Figure 2:
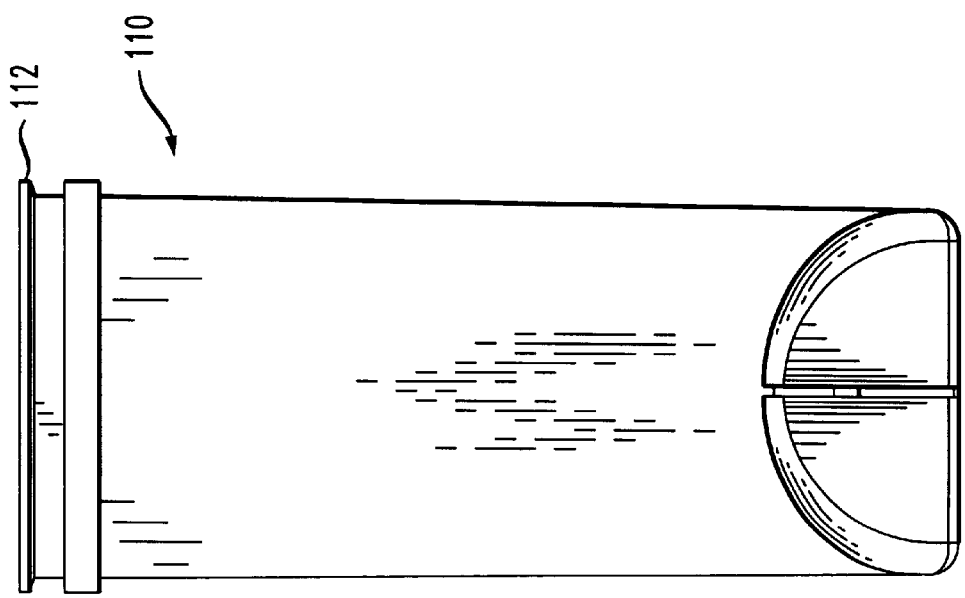
FIG. 2 is a side elevation view of the enclosure shown in FIG. 1.

The present invention is a telecommunications enclosure assembly 100 having a high-pressure seal. FIGS. 1 and 2 show the exemplary enclosure 110, which is a fiber optic enclosure, into which fiber and equipment (not shown), are installed. The interior of the enclosure 100 may contain a card cage (not shown) having slots for accommodating a plurality of printed circuit boards having electrical circuits and/or electrical/optical transducers (not shown). The electrical circuits may provide a variety of functions, such as processing optical and electrical voice, data, and/or video signals, generating alarms and various signaling information, etc. The contents of the enclosure may include a tray having a plurality of attachment sections into which optical fiber splices, connectors or standard end fiber terminations can be retained. Optical fiber which is not being coupled within the enclosure 110 may also be stored within the enclosure.

Figure 3:
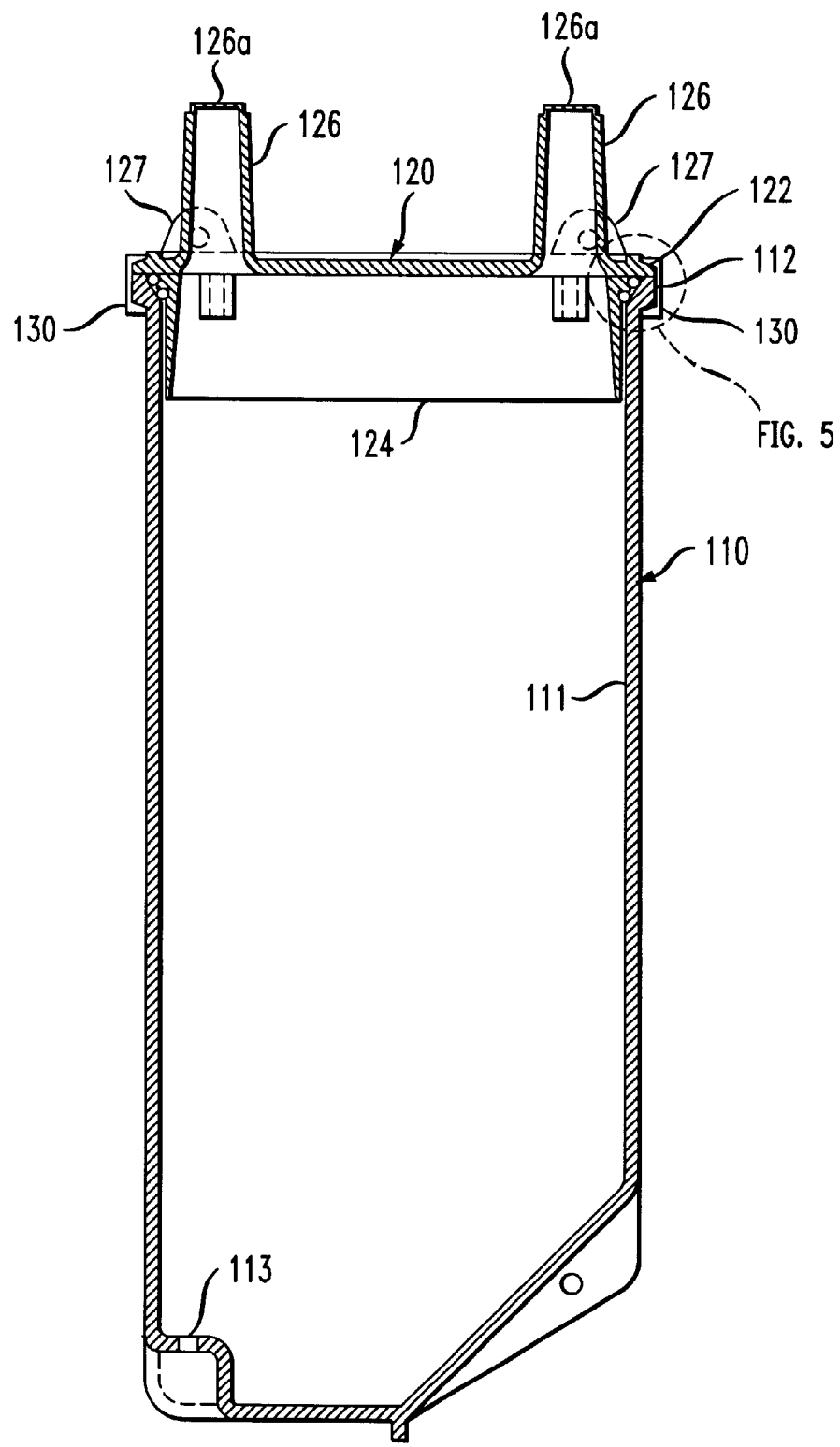
FIG. 3 is a cross sectional view of an assembly including the enclosure of FIG. 1, with a first exemplary end cap inserted therein.
Figure 4:
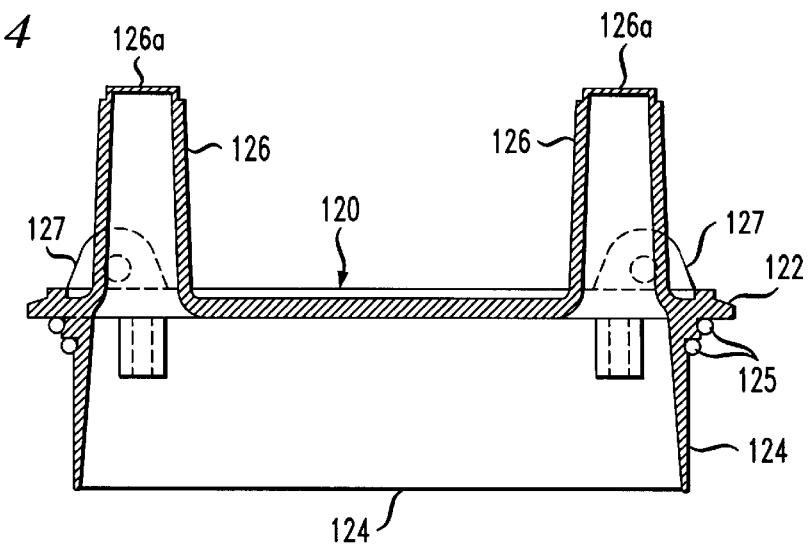
FIG. 4 is a cross sectional view of the end cap shown in FIG. 3.
Figure 5:
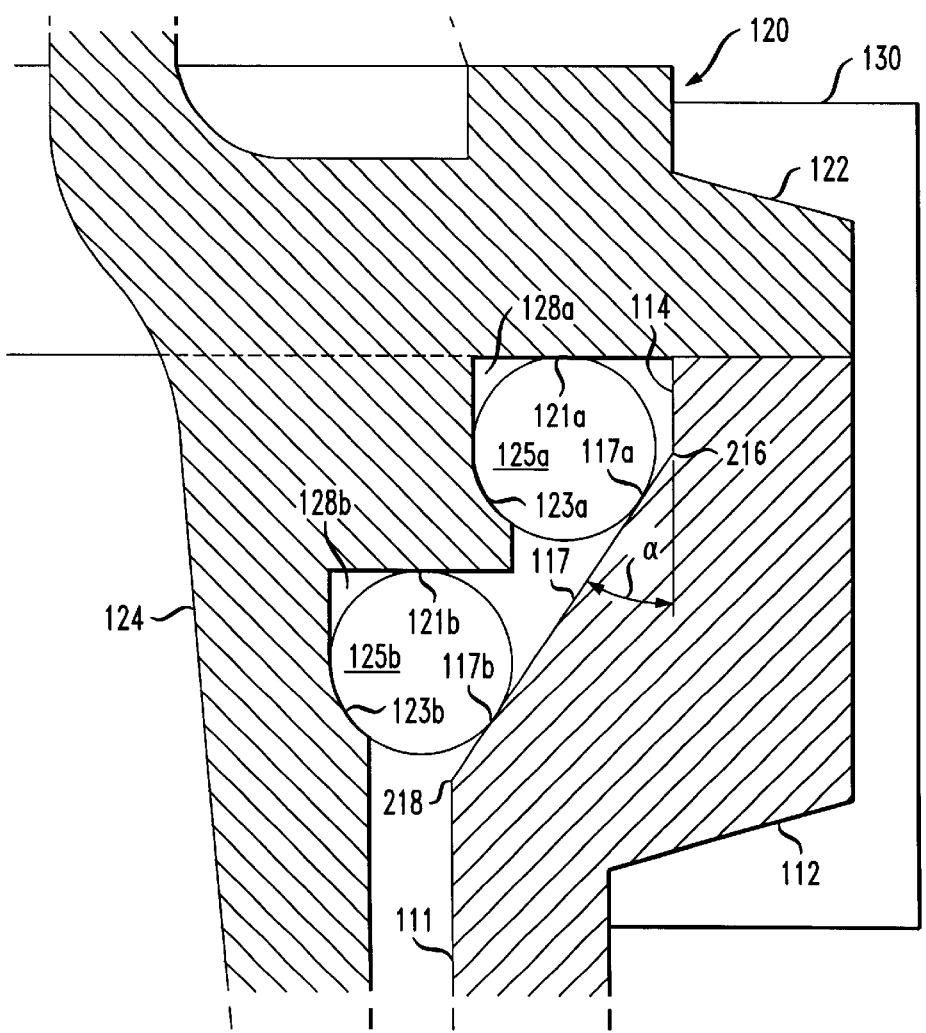
FIG. 5 is an enlarged detail of the enclosure assembly of FIG. 3.

FIG. 3 is a cross sectional view of the enclosure assembly 100, with the end cap 120 inserted in the enclosure 110. FIG. 4 shows the end cap 120 according to the invention. FIG. 5 is an enlarged detail of the rim portion of the enclosure assembly 100. The assembly 100 includes a fiber optic enclosure 110 having an inner rim 114. The top of rim 114 has a diameter that is larger than the diameter of the main part 111 of the enclosure 110. A tilted surface 117 transitions from the enlarged diameter of the rim section 114 to the reduced diameter of the main section 11 1. The slope of the enclosure housing 110 changes at two points 116 and 118, which define the tilted surface 117.

The enclosure 110 has an opening 113 through which pressurized air can be introduced to the enclosure. A valve (not shown) can be mounted in the hole 113, to allow either introduction of air or the measurement of air pressure in the enclosure assembly 100.

In the exemplary embodiment, the inner surfaces of rim 114 and the main section 111 are substantially vertical in cross section. The tilted surface 117 is tilted at an angle α (FIG. 5) between about 30 degrees and about 60 degrees from the vertical. A preferred angle α is about 45 degrees.

An end cap 120 is shaped to fit the enclosure 110. The end cap 120 has a plurality of cable ports 126, through which cables (not shown), which may contain optical fibers, enter the enclosure assembly 100. The cable ports 126 may have a variety of sizes to accommodate differently sized cables. Prior to installation, each of the cable ports 126 has a flat disk 126a integrally attached to the end of the cable port. The flat disks 126a are left on unused cable ports 126 until they are used, so that the enclosure assembly 100 can be sealed and pressurized. To use one of the cable ports 126, the top of the cable port, including the flat disk 126a is cut off with a blade, which may be a saw blade. When a cable (not shown) is inserted through a cable port 126, a seal is placed around the cable port, typically using a sleeve of heat shrink tubing. The end cap 120 also has a pair of mounting ears 127 with holes. The mounting ears 127 may be used to suspend the enclosure assembly 100 from a pedestal or pole.

As best seen in FIGS. 4 and 5, end cap 220 has at least one o-ring 125a. Preferably, for high pressure applications, two o-rings 125a and 125b are provided. The provision of a second o-ring increases the maximum pressure rating of the enclosure approximately two times, compared to enclosures having only a single o-ring. The o-rings 125a, 125b may be conventional elastomeric o-rings.

The end cap 120 is shaped to fit the enclosure 110. The end cap 120 has a groove 128a, 128b for respective o-rings 125a and 125b. The groove 128a has at least two sides 121a and 123a (groove 128b has two sides 121b and 123b) for holding the o-ring 125 in a position to contact the tilted surface 117 of the rim 114. By this construction, the o-ring 125a is compressed between at least three surfaces (117a, 121a, 123a) when the end cap 120 is in place on the enclosure 110. Similarly, the o-ring 125b is compressed between at least three surfaces (117b, 121b, 123b). This forms a high pressure seal between the end cap 120 and the tilted surface 117 of the rim 114, with built-in redundancy. The groove 128a of the end cap 120 has a curved surface 123a for holding the o-ring 125a. Similarly, groove 128b of the end cap 120 has a curved surface, 123b for holding the o-ring 125b. Thus, as shown in FIG. 4, the o-rings 125a and 125b are retained by the end cap within respective grooves 128a and 128b, when the end cap is removed from the enclosure 110. Preferably, the groove 128a (128b) is configured so that it is necessary to stretch the o-ring 125a (125b) to install the o-ring in the groove, or to remove the o-ring. Thus, once installed, the o-ring 125a (125b) is trapped by the surface 123a (123b) of the groove until the o-ring is intentionally stretched by the installer for purpose of removal.

The groove 128a of the end cap 120 has a surface 121a that is between about 120 degrees and about 150 degrees from the tilted surface 117 of the enclosure 110. The curved surface 123a has an angle with respect to the tilted surface 117 that varies from about 90 degrees to about 150 degrees. Thus, the three locations (117a, 121a, 123a) at which the o-ring 125a is compressed against surfaces are distributed approximately evenly in terms of angle. As a result, the downward compression force exerted by end cap 120 on the o-ring 125a is resolved into two approximately equal forces: a first force between surface 123a and the o-ring 125a, and a second force between surface 117a and o-ring 125a.

By splitting the force over multiple surfaces of the o-ring, the reliability of the seal is enhanced. For example, even if a particle or impurity (e.g., dirt particle or grease) between o-ring 125a and curved surface 123a compromises the integrity of the seal at surface 123a and permits air to leak through at that location, the seal at surface 117a is unaffected, and there is still an effective seal between the end cap 120 and the enclosure 110.

As shown in FIGS. 3 and 5, to assemble the enclosure assembly 100, the end cap 120 is inserted all the way into the enclosure 110. Both of the o-rings 125a and 125b contact the tilted surface 117 of the rim 114, and are compressed against the tilted surface. The enclosure 110 and end cap 120 have respective mating parts 112 and 122, which abut each other when the end cap is completely inserted. Once the end cap 120 is installed on the enclosure 110, a clamp 130 is applied to clamp the end cap 120 to the enclosure 110, and to keep the end cap from moving. The clamp 130 may be, for example, a V-clamp. U.S. Pat. No. 5,315,489 to McCall et al. is expressly incorporated by reference herein for its teachings on a clamp suitable for use on fiber enclosures. A clamp as described by McCall et al. may be used to clamp the enclosure assembly 100. The clamp 130 provides the compression force that maintains the seal between the o-rings 125a, 125b and the end cap 120, and between the o-rings and the tilted surface 117 of the enclosure 110.

The enclosure 110 and end cap 120 according to the invention may be formed using any material used for conventional fiber enclosures, such as those described in U.S. Pat. Nos. 5,069,516 and 5,396,575, which are incorporated by reference herein.

Figure 6:
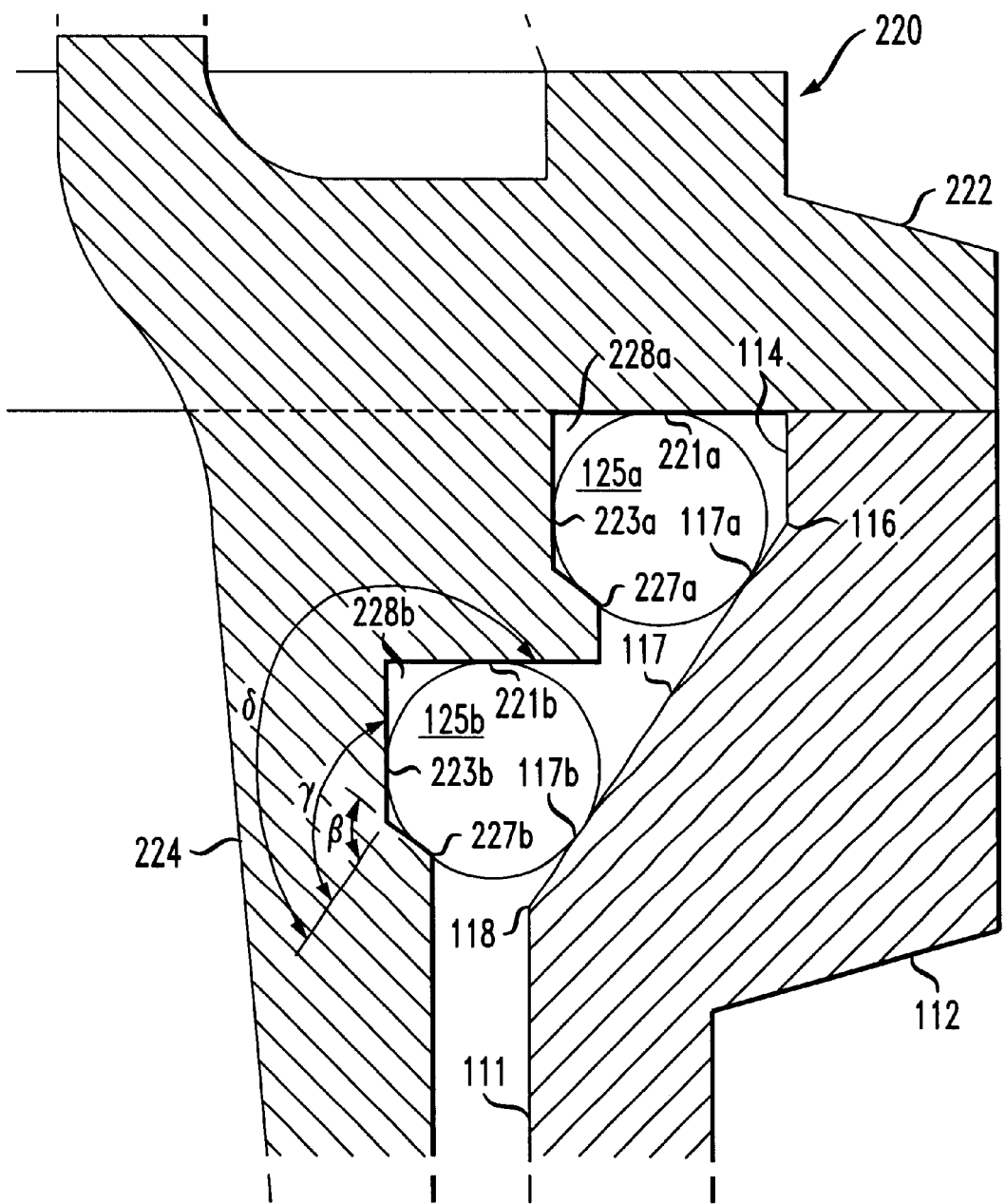
FIG. 6 is an enlarged detail of a variation of the exemplary embodiment of FIG. 3.

FIG. 6 shows a variation of the end cap, in which groove 228a has three flat surfaces 221a, 223a and 227a, and groove 228b has three flat surfaces 221b, 223b and 227b. The three surfaces 221a, 223a and 227a of the groove 228a are positioned at respective angles $\beta$, $\gamma$, and $\delta$ measured from the tilted surface. In the example of FIG. 6, the angles $\beta$, $\gamma$, and $\delta$ are approximately 90 degrees, approximately 135 degrees and approximately 225 degrees from the tilted surface 117a respectively.

Other suitable angles can readily be determined by those of ordinary skill in the art. In general, the surfaces 123a and 117 should be approximately symmetrically placed with respect to the surface 121a, so that the compression force created by the clamped end cap is resolved into two approximately equal forces. The end result is that two seals are formed having similar sealing characteristics.

In general, either a curved surface 123a (FIG. 5) or a pair of flat surfaces 223a, 227a (FIG. 6) may be used with similar results. If, however, the pair of flat surface 223a, 227a are used, the angles and lengths of the surfaces should be designed so that there is no sharp edge of the groove digging into the o-ring, which would damage the o-ring.

A sealed enclosure according to the present invention is especially advantageous for high pressure applications, such as for enclosures deployed underwater, or underground in areas with severe temperature and moisture conditions.

Although the exemplary embodiment is described in the context of a fiber optic enclosure, the exemplary enclosure is not limited to fiber, and may be used for other electronic equipment, where a high-pressure, water-tight seal is desired.

Although the exemplary enclosure assembly 100 includes two o-rings 125a, 125b, additional redundancy and pressure capability may be achieved by the addition of further o-rings.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. A sealed telecommunications enclosure assembly, comprising:
   a telecommunications enclosure having an inner rim, the inner rim having an upwardly facing tilted surface;
   at least two o-rings; and
   an end cap shaped to fit the enclosure, the end cap having at least two grooves for holding the o-rings in a position to contact the tilted surface of the rim, so that each o-ring is compressed to form a seal between the rim and the end cap.

2. The sealed telecommunications enclosure assembly of claim 1, wherein each groove has at least two sides for holding the o-ring in a position to contact the tilted surface of the rim, so that the o-ring is compressed between at least three surfaces when the end cap is in place on the enclosure.

3. The telecommunications enclosure assembly of claim 1, wherein the tilted surface of the enclosure has a tilt angle between about 30 degrees and about 60 degrees.

4. The telecommunications enclosure assembly of claim 1, wherein the grooves of the end cap have respective surfaces between about 120 degrees and about 150 degrees from the tilted surface of the enclosure.

5. The telecommunications enclosure assembly of claim 1, wherein each groove of the end cap has a curved surface for holding the corresponding o-ring, the curved surface approximately following the contour of that o-ring.

6. The telecommunications enclosure assembly of claim 1, wherein each groove of the end cap has three surfaces.

7. The telecommunications enclosure assembly of claim 6, wherein the three surfaces of each groove of the end cap are positioned at approximately 90 degrees, approximately 135 degrees and approximately 225 degrees from the tilted surface of the enclosure.

8. The sealed telecommunications enclosure assembly of claim 1, wherein:

the tilted surface of the enclosure has a tilt angle between about 30 degrees and about 60 degrees; and each groove has two flat surfaces and a curved surface continuous with one of the flat surfaces, for holding a corresponding o-ring in a position to contact the tilted surface of the rim, the two flat surfaces of each groove of the end cap being positioned at approximately 135 degrees and approximately 225 degrees from the tilted surface of the enclosure, the curved surface of each groove approximately following a contour of the o-ring, so that each o-ring is compressed between four surfaces when the end cap is in place on the enclosure.

9. The sealed telecommunications enclosure assembly of claim 1, wherein:

the tilted surface of the enclosure has a tilt angle between about 30 degrees and about 60 degrees; and each groove has three surfaces for holding a corresponding o-ring in a position to contact the tilted surface of the rim, the three surfaces of each groove of the end cap being positioned at approximately 90 degrees, approximately 135 degrees and approximately 225 degrees from the tilted surface of the enclosure, so that each o-ring is compressed between four surfaces when the end cap is in place on the enclosure.

10. The sealed telecommunications enclosure assembly of claim 1, wherein the at least two o-rings are positioned around portions of the end cap having respectively different diameters.

11. The sealed telecommunications enclosure assembly of claim 1, wherein at least two o-rings are positioned at different heights on the end cap.

12. The sealed telecommunications enclosure assembly of claim 1, wherein each o-ring is compressed against three surfaces at three locations that are distributed approximately evenly in terms of angle.

* * * * *